United States Patent [19]

Kimura et al.

[11] Patent Number: 4,988,435
[45] Date of Patent: Jan. 29, 1991

[54] AUTOMATIC SORTING SYSTEM

[75] Inventors: Minao Kimura, Tokorozawa; Shinichiro No, Hoya, both of Japan

[73] Assignee: Kabushiki Kaisha Yakult Honsha, Tokyo, Japan

[21] Appl. No.: 264,563

[22] Filed: Oct. 31, 1988

[30] Foreign Application Priority Data

Oct. 30, 1987 [JP] Japan .................... 62-273338

[51] Int. Cl.$^5$ .................. B07C 5/36; B65G 47/46; B65G 47/82
[52] U.S. Cl. ................... 209/560; 209/523; 209/653; 198/367; 198/372
[58] Field of Search ........ 209/522, 523, 552, 651–654, 209/559–561; 198/365, 367, 372, 440

[56] References Cited

U.S. PATENT DOCUMENTS

| | | | |
|---|---|---|---|
| 2,609,926 | 9/1952 | Hartig et al. | 209/524 |
| 3,471,012 | 10/1969 | Calhoun | 209/653 X |
| 3,791,518 | 2/1974 | Vanderhoof | 209/653 X |
| 4,320,840 | 3/1982 | Braschos | 209/652 X |
| 4,474,295 | 10/1984 | Braschos | 209/653 |
| 4,501,365 | 2/1985 | Peyton et al. | 209/653 X |

FOREIGN PATENT DOCUMENTS

| | | | |
|---|---|---|---|
| 2941576 | 4/1981 | Fed. Rep. of Germany | 209/522 |
| 3426713 | 1/1986 | Fed. Rep. of Germany | 198/372 |
| 2069439 | 8/1981 | United Kingdom | 198/367 |

*Primary Examiner*—Johnny D. Cherry
*Assistant Examiner*—Edward M. Wacyra
*Attorney, Agent, or Firm*—Beveridge, DeGrandi & Weilacher

[57] ABSTRACT

An automatic sorting system for automatically sorting objects comprises a control guide which branches off into a plurality of branches having different depths, moving members which have rod-like pins which are guided by the control guide and divert the objects in a transverse direction, and a pin-moving device, such as cam, for moving the pin of each moving member vertically in response to a signal generated by a detecting device. The cam has two arc portions of different radii which depress a transversely slidable rod of the moving member. The moving member follows a path determined by the control guide having a depth corresponding to a depending length of the rod of the moving member, and is guided along this control guide groove. With this system, good or defective articles are automatically diverted in a transverse direction by the moving members, so that the objects are sorted based on a their transverse positions.

29 Claims, 13 Drawing Sheets

FIG. 7A
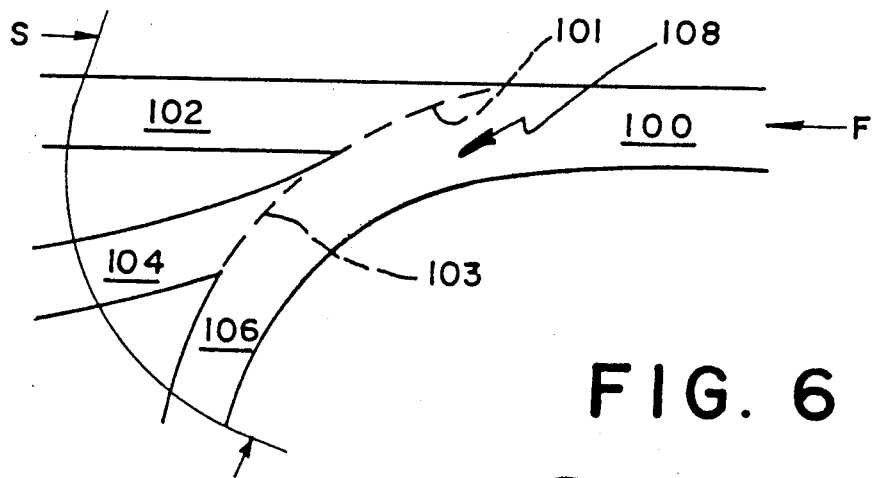
FIG. 6
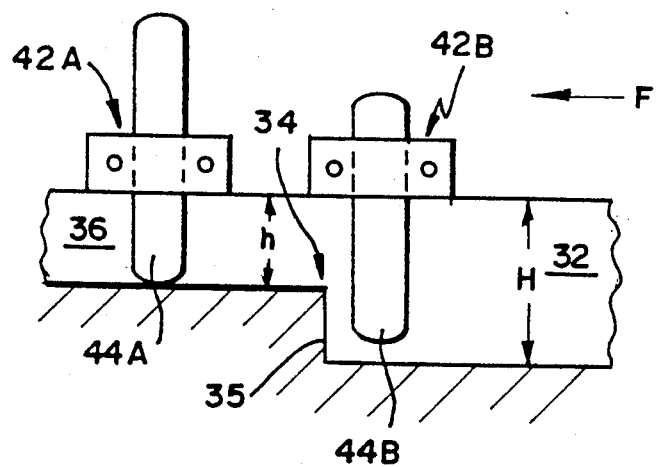
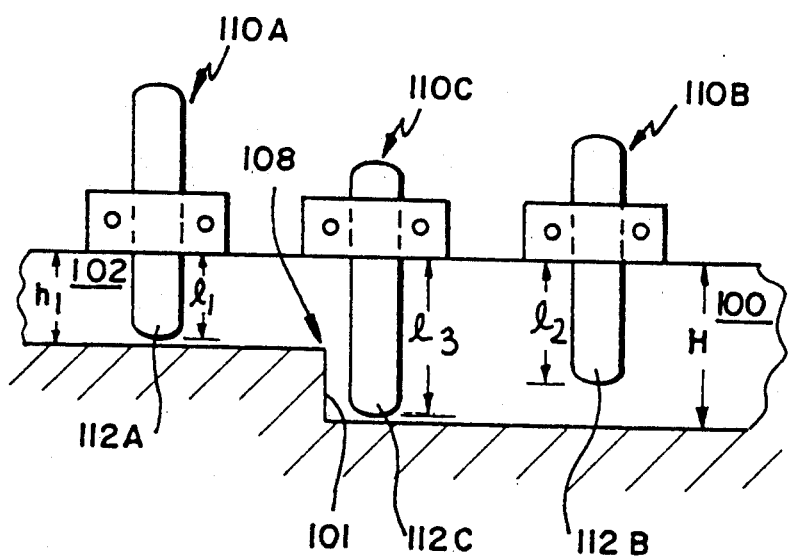
FIG. 8

AUTOMATIC SORTING SYSTEM

FIELD OF THE INVENTION

The present invention relates to an automatic sorting system for accurately and quickly sorting a number of objects in response to an output signal of a detecting device.

DESCRIPTION OF PRIOR ART

There are a large number of objects which are mass produced and processed in manufacturing facilities, such as bottles, cans, containers, or the like which are filled with beverages or other contents. Various methods of classifying or sorting such vessels or other objects are known.

In a method known as a "2-kind sorting method," the objects are sorted into two groups, i.e. a "good articles group" and "a defective articles group". An article belonging in the "good articles group" can be up to various kinds of standards, however, an article belonging in the "defective articles group" is below the standards.

In a so-called "3-kind sorting method," the objects are sorted into three groups. An object belonging in the first group exceeds a reference value by a certain amount. The value of an object belonging in the second group is within an allowance-range of the reference value. The value of an object in the third group is lower than the reference value by a certain amount.

In a method known as a "multikind sorting method," the objects are sorted into four or more groups in accordance with predetermined reference values or standards.

Hitherto, many kinds of machines for automatically performing such kinds of sorting processes, especially, the 2-kind sorting process, have been proposed. As such a conventional automatic sorting apparatus, for instance, there is an apparatus in which the quality of each object conveyed by a conveyor is discriminated by a sensor and defective objects are pushed off of the conveyor by an ejector mechanism, air jet means, or the like, thereby forcibly discharging the defective article from the conveyor. Also, there is a known apparatus in which a trap door with an opening/closing mechanism is provided on the passage along which objects are conveyed. In said apparatus, when a defective article passes over the trap door, the door is opened to drop said defective article, thereby eliminating it from the stream of good articles being conveyed.

In each of the foregoing types of machines, since shock and load are applied to the defective object, the entire ejected object is damaged so that even its reusable portions cannot be used again.

In order to avoid such a problem, there has been a proposal for an automatic sorting apparatus in which objects to be sorted are statically handled so as not to apply a shock to the objects. Such an apparatus is shown in FIGS. 14A, 14B, and 15. In FIG. 14A, this automatic sorting apparatus 1 has a plurality of continuous plates 2 which carry beverage-containing vessels or other objects. As shown in FIG. 14B, each of the plates 2 is slidably supported by two slide rods 3. A pin 4 is attached vertically at the center of the plate 2. The pin 4 is guided by a passage 6 provided in a space between collars 5, thereby the plate 2 is led toward a sorting portion 7. As will be explained hereinafter, the sorting portion 7 has a diverting switch member and a branched rail. By means of the sorting portion 7, the plate 2 arriving from the collars 5 moves straight, or it is moved to the right or left direction, in response to a signal from a sensor.

The sorting portion 7 consisting of the diverting switch member and rail will now be further described in detail with reference to FIG. 15.

The diverting switch member 10 is rotatable around a shaft 11 as a rotational center. Rods 13A, 13B, 13C, and 13D, which are respectively pressed by corresponding cylinders 12A, 12B, 12C, and 12D, are in contact with the diverting switch member 10. A rail 14 is continuously coupled with the diverting switch member 10. Three passages 15A, 15B, and 15C are formed on the rail 14.

The pin 4 passes through a central portion 10A of the diverting switch member 10, and thereafter, it passes along either one of the three passages 15A, 15B, and 15C.

When the sensor determines that an object is a good article, the diverting switch member 10 is set at a position indicated by a solid line in FIG. 15, so that the pin 4 passes through the central passage 10A of the diverting switch member 10 and then passes along the passage 15A. Therefore, the plate 2, on which the object is put, continues in a straight path in the central portion of the apparatus 1.

If the sensor judges that an object is defective, the cylinders 12A to 12D are actuated so the diverting switch member 10 is rotated by the rods 13A to 13D to a position 10' indicated by the double dot line in FIG. 15. Thus, the pin 4 arriving from the passage 10A passes along the passage 15B, so that the defective object on the plate 2 is diverted to the right side in FIG. 15, relative to the good article on the apparatus 1, and said object advances on the conveyor. On the other hand, by rotating the diverting switch member in the direction opposite to the passage 15B, the pin 4 passes along the passage 15C, so that its plate 2 and the object thereon are diverted to the left side, relative to the good article.

Just after a pin of a plate which carries a defective article has entered the passage 15B or 15C, the diverting switch member 10 is returned to the original central position shown by the solid line. Therefore, a pin of a subsequent plate which carries a good article is led toward the passage 15A.

As explained above, since the plate which carries the object goes straight or is diverted and then advances, no shock is applied to the object.

However, the automatic sorting apparatus of the type shown in FIGS. 14A, 14B, and 15 has a problem such that a sorting speed, i.e., a speed for conveying the object to be sorted, cannot exceed a predetermined speed. If the conveying speed of the object is set to a high speed, the time interval between the pins 4 is reduced. Thus, for example, when the diverting switch member located at the position indicated by the double-dot line 10' in FIG. 15, there is a fear such that a pin 4B on a plate which carries a good article, since it follows a pin 4A on a plate which carries a defective article, will be sandwiched and locked between a front end portion 16A of the rail 14 and a rear edge portion 17 of the diverting switch member 10, or will be lifted up in the direction perpendicular to the paper surface of FIG. 15. On the other hand, it is difficult to synchronize the rotation of the diverting switch member 10 with the conveyance of the object. There is also a fear that the pin of the plate which carries a defective article will pass through the passage 15A, and a pin of a plate which carries a good article will pass through the passage 15B or 15C. Further, since existing conveyors cannot be used with the apparatus mentioned above, this apparatus is uneconomical.

SUMMARY OF THE INVENTION

The present invention is made in view of the foregoing problems in known techniques. It is an object of the present invention to provide an automatic sorting system in which an object to be sorted can be statically handled without applying a shock to this object, even at high sorting speeds.

According to the present invention, this object is accomplished by an automatic sorting system for sorting objects, comprising: a control guide which may be a smooth curve and/or a straight line and being branched into a plurality of said guides having different depths; moving members having pin portions which are guided by the control guide and diverting the object in a transverse direction; and, a pin-moving device for vertically moving the guide-following pin of the moving member in response to a signal generated by a detecting device.

According to the invention, the object is pushed transversely by the moving members, i.e. in a direction perpendicular to the forward conveying direction of the objects. The paths of the moving members are guided by the control guides, so each moving member is moved along the path of one of the control guides. Namely, the object is pushed transversely bY the moving members along the path of the control guide, and a trace of movement of the object is in parallel with said path. As the control guide is a smooth curve and/or a straight line, the object can be statically pushed out by the moving members without applying a shock to the object.

The guide-following pin of the moving member is moved in the vertical direction by the pin-moving device in response to a detection signal generated from the detecting device for measuring or discriminating an object. So, a depending length of the pin which is inserted in the groove-shaped control guide is adjusted to a predetermined numerical value. The guide-following pin portion of the moving member does not enter a control guide the depth of which is shorter than the depending length of the guide-following pin, and the depths of the control guides are different from one another. Therefore, in the branching section of the control guide, each pin enters the control guide the depth of which corresponds to the depending length of the pin. In this case, the amount of transverse diversion of the object depends on which control guide the pin of the moving member is inserted. Accordingly, when the pin is inserted in different control guides, the amount of diversion in the horizontal direction by the moving member is also different, and therefore, the position of the object on its conveyor is also different. Thus, the objects can be sorted on the basis of their transverse locations on the conveyor.

According to the automatic sorting system of the present invention, the guide-following pin of the moving member does not enter a guide other than a predetermined control guide in the branching section, so there is no fear of malfunction. Also, since there are no rotating members in the branching section of the control guide, locking of the pin or lifting of the control guide are prevented. Consequently, even if the sorting speed is increased, the inconveniences which have been experienced in conventional techniques do not occur. Moreover, a large number of objects can be accurately and quickly sorted.

Further, since the automatic sorting system of the present invention can be also be combined with the existing conveyors as explained hereinafter, this system is very economical.

When embodying the invention, the control guide may be branched off into two control guides in the branching section or it may be branched off into three or more control guides. When the control guide branches off into two control guides, this system is used in a 2-kind sorting system for sorting objects into a good article group and a defective article group. When the control guide branches off into three control guides, this system is used in the 3-kind sorting system for sorting an object into three groups: for instance, the volume or weight is within an allowance range of a reference value, exceeds the reference value, and is lower than the reference value. When the control guide is branched to four or more control guides, this system is used in a system so-called "multikind sorting system".

In the case of using the system of the invention in a multikind sorting system, two or more branching sections of the control guide can be provided. By increasing the number of branching sections, the control guide can have a number of branches which corresponds to the number of kinds to be sorted. In addition, since the number of control guides which branch out from each branching section can be reduced by increasing the number of branching sections, each branching section can be easily worked.

It is desirable that a plurality of control guide branches are again combined into one control guide. This makes it possible to endlessly circulate the moving members which progress along the control guide.

It is preferable to provide each moving member with a rod for diverting objects. If a plate for pushing an object is attached to the front end portion of the rod, or an elastic material is attached to the front end of the rod, this structure will be preferable for pushing the object. Further, it is desirable to attach a rotatable roller to the front end portion of the rod.

The front end portion of the rod can be also constructed so as to abut on the side edge of a flat plate which carries an object, or the flat plate and rod can be connected together rigidly. With such a structure, the flat plate moves together with the moving members, and the object being put on the flat plate also moves. In this case, one object may be put on the flat plate or on a plurality of flat plates. In the case where the front end of the rod is in contact with the side edge of the flat plate, it is desirable to press the flat plate toward the rod. In this manner, the front end of the rod and the side edge of the flat plate will always be in contact with each other.

The moving member has a main body portion rigidly connected to the rod. It is preferable that the guide-following pin slidably penetrates the main body portion, with only a slight amount of friction to prevent gravitational movement of the pin. With this construction, the rod of the moving member can push an object, and the trace of movement of said object is parallel with the path of the control guide into which the pin of the corresponding moving member is entered. Also, by slidably fitting the guide-following pin into the main body portion, the depending length of the pin, i.e. the length which enters the control guide, can be easily changed.

Further, it is preferable that the rod of the moving member slidably penetrates a pin and/or link of a chain, and a plurality of moving members simultaneously move in the forward movement direction of the chain. With this structure, a plurality of moving members can be easily endlessly circulated by the chain and the object can be easily diverted by the rod in the direction transverse to the progressing direction of the moving members and the chain.

A silent chain is preferably used to reduce noise. Also, it is possible to use, in place of the chain, a timing belt provided with a thrust bearing that is mounted perpendicular to the running direction of the moving member of the belt.

The pin-moving device preferably has a cam consisting of a combination of a plurality of arcs having different radii. It is desirable to rotate the cam with a rotating shaft which is rotated by a chain-driven sprocket. This simplifies construction when the same driving source is used to rotate the cam and to drive move the chain which carries the moving members.

In order to rotate the cam, it is desirable to provide a clutch on the camshaft, and to engage and disengage the clutch in response to a signal generated from the detecting device. However, it is also possible to couple a rotating drive member directly to the camshaft, and to stop and start the drive member in response to the signal generated from the detecting device.

The pin-moving device that vertically moves the guide-following pin of the moving member may be a piston member, rather than a cam. The stroke of the piston member will change in response to the signal generated from the detecting device.

If the control guide is branched at two or more locations, it is preferable to provide two or more pin-moving devices, at least of which is located on the upstream side just before each of the branching section. This is because the guide-following pin of the moving member is moved vertically to adjust its depending length just before the branching section, thus assuring that each moving member advances along a predetermined control guide to prevent a malfunction.

When the automatic sorting system of the present invention is operated, it is desirable that the object-carrying is arranged adjacent to the moving members. According to the present invention, the sorting operation is performed by using the moving members to divert the object transversely predetermined distance, and by classifying the objects by their transverse positions on the conveyor. Therefore, there is no need to newly equip a special conveyor. The sorting work can be immediately started by merely installing the system of the present invention adjacent to an existing conveyor.

When 2-kind sorting routine is executed by using the automatic sorting system of the present invention, to determine whether the object is a good article or a defective article, it is possible to construct the machine so that only the good objects are pushed transversely in the horizontal direction and the defective objects are not transversely moved but are moved straight. On the contrary, it is also possible to construct such that only the defective objects are pushed transversely by the moving members.

When the automatic sorting system of the invention is used by combining it with an existing conveyor, the moving member moves an object on the conveyor transversely while the moving member is moving horizontally along the control guide, and the object are sorted on the basis of their transverse positions on the conveyor. The forward speed of the conveyor is synchronized with the moving speed of the chain that carries the moving members.

According to the invention, it is also possible to construct the control guide on the bottom plate, and to use the pin-moving device to push the guide-following pin of the moving member vertically downwardly in response to signals from the detecting device. It is also possible to form the control guide on the top plate and to use the pin-moving device to push the pin of the moving member vertically upwardly.

It is desirable to construct the control guide is of the type so that the guide-following pin of the moving member will be supported and/or guided at two opposite positions. For instance, the control guide can be formed like a groove. Alternatively, the pin of the moving member can be guided at one position, e.g. formed like a guide plate. In the embodiment which will be explained hereinbelow, the control guide of the groove type is used, and the guide-following pin of the moving member is inserted in this guide groove.

If the proportion of defective articles is small, it is desirable for the automatic sorting system to be made operative by connecting a switch only when a defective article occurs, thus to eliminate the defective article. This reduces the noises generated when the automatic sorting system operates, and energy can be also saved.

The above and other objects, features, and advantages of the present invention will become apparent from the following detailed description and the appended claims with reference to the accompanying drawings.

BRIEF DESCRIPTION OF THE DRAWINGS

FIG. 6 is a vertical sectional view of FIG. 4A;

FIG. 7A is a plan view of a guide groove which is used in another embodiment of the present invention;

FIGS. 8 and 9 are cross sectional views at different positions of a guide groove shown in FIG. 7A, respectively;

DETAILED DESCRIPTION OF THE PREFERRED EMBODIMENTS

An embodiment of the present invention will be described hereinbelow with reference to FIGS. 1 to 13B.

Figure 1:
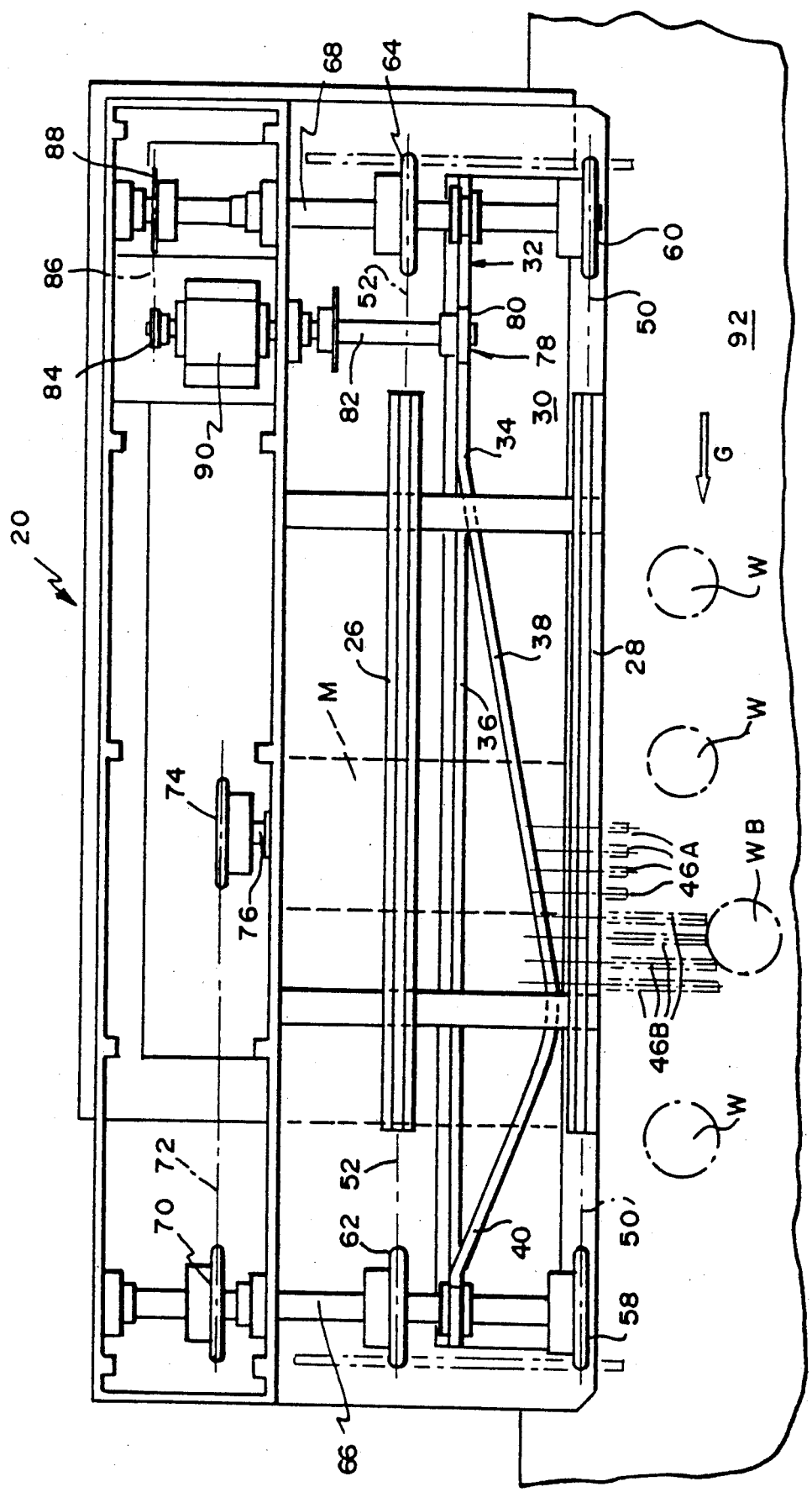
FIG. 1 is a plan view of the first embodiment of an automatic sorting system according to the present invention.
Figure 2:
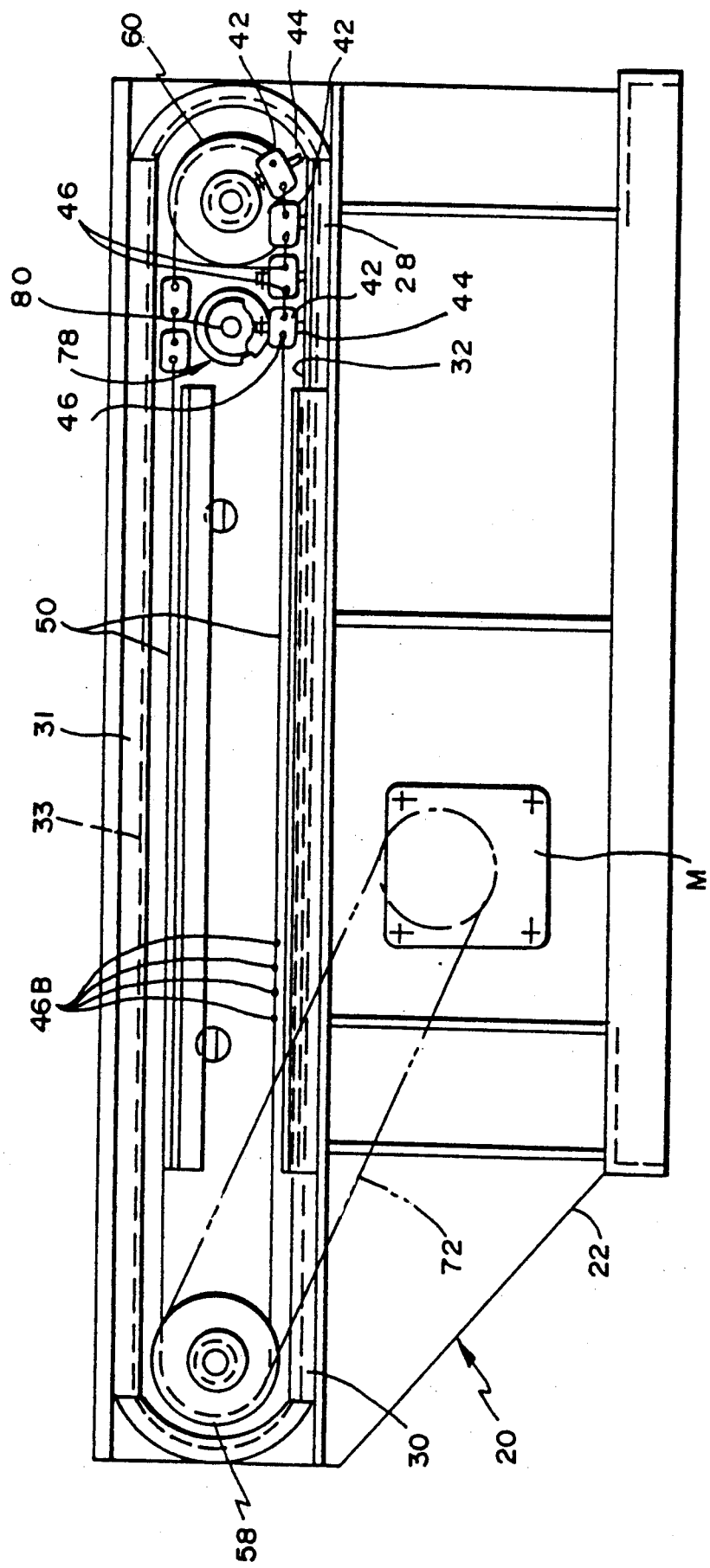
FIG. 2 is a front view of this system.
Figure 3:
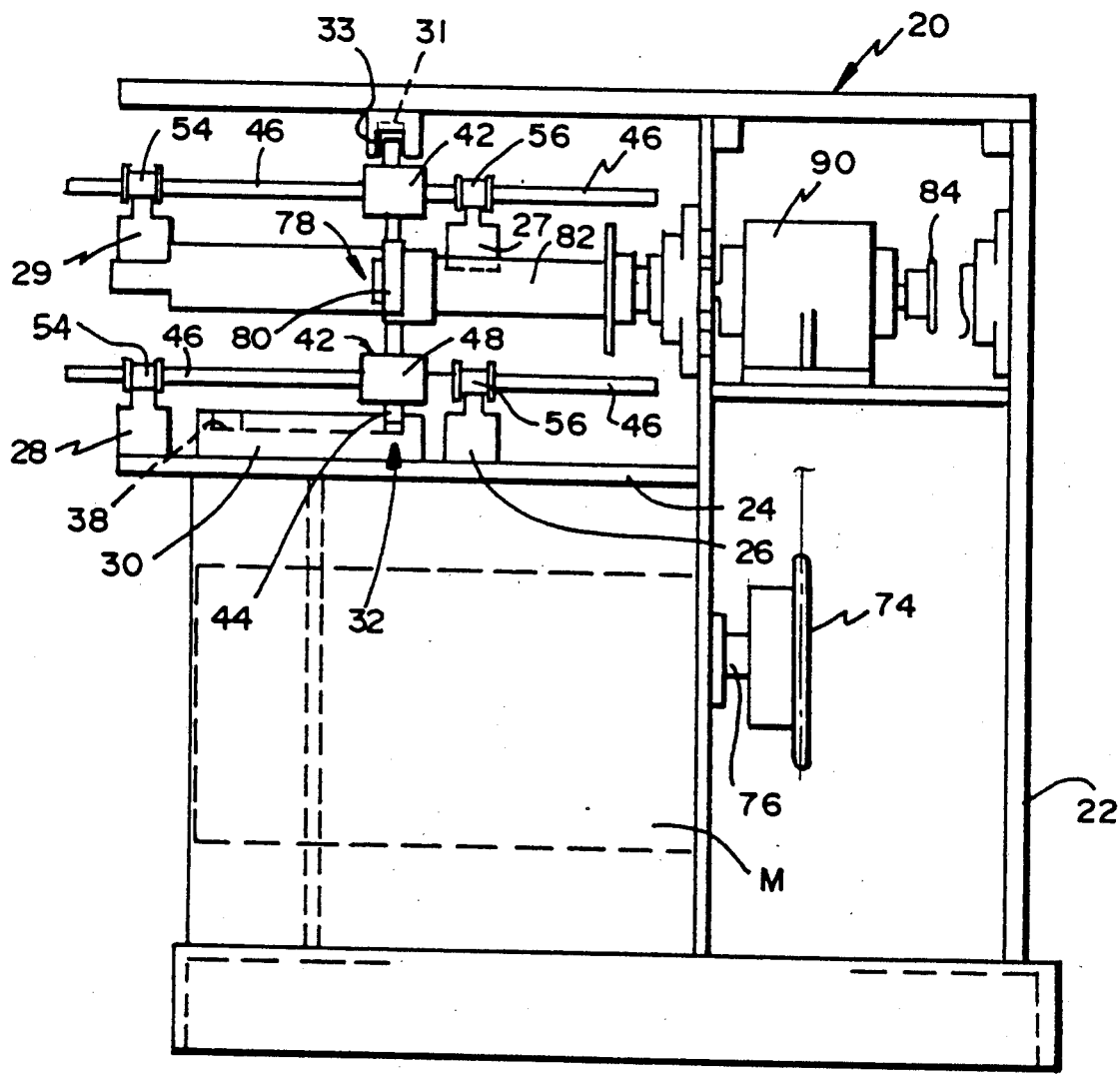
FIG. 3 is a side elevational view of this system.
Figure 4A:
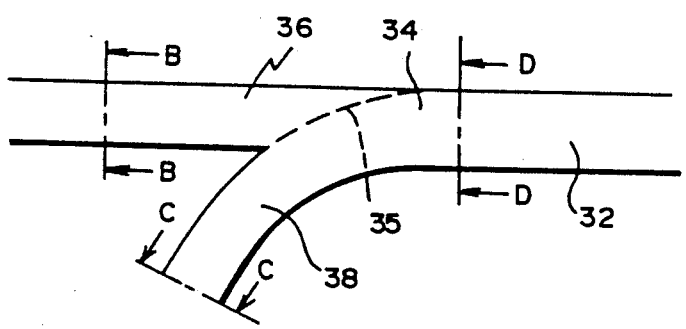
FIG. 4A is a plan view of a branch portion of a guide groove shown in FIG. 1.
Figure 4B:
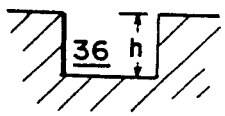
FIG. 4B is a cross sectional view taken along the line B—B in FIG. 4A.
Figure 4C:
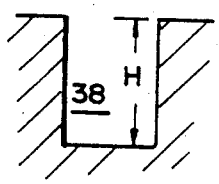
FIG. 4C is a cross sectional view taken along the line C—C in FIG. 4A.
Figure 4D:
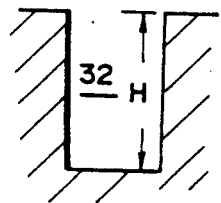
FIG. 4D is a cross sectional view taken along the line D—D in FIG. 4A.

In FIGS. 1 to 3, an automatic sorting system 20 of the present invention is installed on a base 22. Chain guides 26 and 28 and top plate 30, on which a control guide or guide groove is formed, are mounted on an upper plate 24 of the base 22. A top plate 31 is shown in FIG. 2. As shown in FIG. 1, a control guide or guide groove 32 formed on the upper plate 30 branches off into two grooves 36 and 38 in a branching section 34. The two guide grooves 36 and 38 are recombined into one guide groove 32 in a junction section 40. As shown in FIGS. 4A to 4C, the guide grooves 36 and 38 have different depths h and H, and there is a relation of H−h therebetween. As shown in FIG. 4D, the guide groove 32, upstream of the branching area has a depth H which is equal to the depth H of the groove 38.

Guide-following pins 44 of a plurality of moving members 42 project into the guide grooves 32, 36 and 38. The moving member 42 is particularly illustrated in detail in FIG. 3, and it has a rods 46 that are rigidly connected to a main body portion 48. The guide-following pin 44 is slidable in the vertical direction in FIG. 3 with respect to the main body portion 48. As will be understood from FIG. 2, two rods 46 are provided for each of the moving members 42.

The rod 46 slidably penetrates the links 54 and 56 of chains 50 and 52 as shown in FIG. 3. Thus, a plurality of moving members 42 progress synchronously with the advancement of the chains 50 and 52 and are endlessly circulated, as shown in FIG. 2.

The chain 50 is in engagement with sprockets 58 and 60, and the chain 52 is in engagement with sprockets 62 and 64 as shown in FIG. 1. The sprockets 58 and 62 are fixed to a rotating shaft 66, and the sprockets 60 and 64 are also fixed to another rotating shaft 68. Thus, the chains 50 and 52 are synchronously endlessly circulated.

A rotating shaft 76 is rotated by a motor M, and this rotation is transmitted to the rotating shaft 66 via a sprocket 74 fixed to the shaft 76, a chain 72 which engages the sprocket 74, and a sprocket 70 which engages the chain 72. Thus, the plurality of moving members 42 are endlessly circulated by using the motor M as a driving source.

Figure 5:
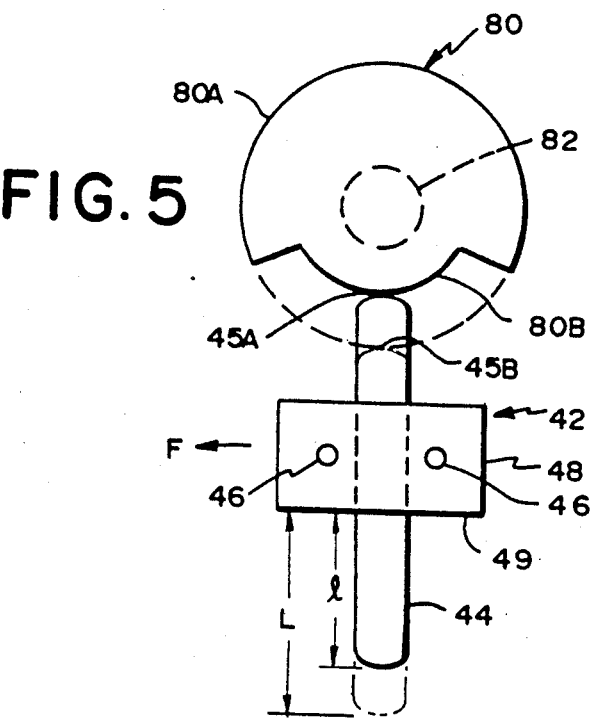
FIG. 5 is a front view of a pin-moving device shown in FIG. 1.

A pin-moving device 78 is provided just before the branching section 34 of the guide groove 32. As shown in FIGS. 2 and 5, the pin-moving device 78 has a cam 80 formed with two arcs having different radii. The pin-moving device 78 is arranged at a position where it will contact the upper ends of the guide-following pins 44 of the moving members 42 that are approaching the branching area 34.

The cam 80 of the pin-moving device 78 is fixed to a rotating shaft 82. The rotation of the shaft 68 is transmitted to the rotating shaft 82 through a sprocket 88, a chain 86, and a sprocket 84. A clutch 90 is attached to the rotating shaft 82. Through the clutch 90, rotation of the sprocket 84 is transmitted to the cam 80. The engagement or disengagement of the clutch 90 is performed in response to an output signal generated from a detecting device that is schematically illustrated by a box DD in FIG. 1.

In FIG. 1, a conveyor 92 is provided beside the automatic sorting system 20. A plurality of objects W to be sorted are put on and carried by the conveyor 92 in the machine direction.

The operation of the embodiment shown in FIGS. 1 to 3 will now be described with reference to FIGS. 4A to 4D, 5, and 6.

As mentioned above, the pin-moving device 78 is arranged on the upstream side of the branching section 34 of the guide groove. As shown in FIG. 5, the cam 80 has a large arc portion 80A and a small arc portion 80B. In the state shown in FIG. 5, the small arc portion 80B is in contact with an upper end portion 45A of the guide-following pin 44 of the moving member 42. The lower end of the pin 44, being lower than a lower surface 49 of the main body portion 48, is shown by character $l$. The depending length is less than the depth h of the shallower guide groove 36 shown in FIG. 4B ($l \leq h$).

The clutch 90 shown in FIG. 1 is engaged in response to a signal from the detecting device DD. When the cam 80 rotates by one half revolution around the rotating shaft 82 as a rotational center, the large arc portion 80A contacts the upper end of the pin 44 as indicated by a broken line in FIG. 5, and the upper end of the pin 44 descends to a position 45B shown by a broken line. Thus, the depending length of the pin 44 is now as shown by character L. In other words, the pin 44 moves downwardly by the distance of (L−$l$). In this case, there is a relation of h<L=H, where H is the depth of the guide groove 38 as shown in FIG. 4C.

With reference to FIGS. 4A and 6, a consideration will now be made with regard to the case where both a moving member 42A having a guide-following pin 44A depending a distance and a moving member 42B having a guide-following pin 44B depending a distance L, progress in the direction indicated by an arrow F toward the branching section 34.

In the branching section 34, a diverting wall or step portion 35, indicated by a broken line in FIG. 4A, is formed because the upstream ends of the grooves 36 and 38 are of unequal depths so as to extend the guide groove 38. As will be understood from FIG. 6, the diverting wall 35 has the height difference of (L−$l$).

The moving member 42A, having the pin 44A with a depending length $l$ goes straight in the direction of the arrow F, passing over the diverting wall 35 and into the shallower guide groove 36. Thereafter, the member 42A goes straight along the guide groove 36.

On the other hand, the member 42B with its pin 44B can move along the deeper guide groove 32; however, it cannot pass over the wall 45 into the groove 36, as clearly shown in FIG. 6. Therefore, the moving member 42B is diverted by the wall 35 into the groove 38.

Referring now to FIG. 1, since the guide groove 36 extends in a straight line, the moving member 42A entering this groove also goes straight without changing its position in the horizontal direction perpendicular to the chains 50 and 52. Therefore, the rods 46A of the moving member 42A also progress in the longitudinal direction without coming into contact with the object W on the conveyor 92. On the other hand, since the guide groove 38 is curved toward the conveyor 92 and object W, the moving member 42B entering the guide groove 38 also approaches the object W. The rods 46B of the moving member 42B divert a predetermined object WB transversely on the conveyor 92. Thus, since the transverse positions on the conveyor 92 of the diverted object WB and the undiverted object W are clearly different, the two kinds of objects WB and W can be sorted in a 2-kind sorting routine.

The detecting device DD and clutch 90 are synchronized in a manner such that when the moving member 42B passes just below the pin-moving cam 80, the large arc portion 80A of the cam 80 contacts the pin 44B, and the pin 44B is downwardly depressed. Thus, the object WB will be pushed out by the rod 46B and can be sorted.

The moving member 42B which diverts the object WB downwardly in FIG. 1 by the rod 46B advances along the guide groove 38 to the junction section where it joins with the moving member 42A which has progressed along the groove 36. Thereafter, both of the moving members 42A and 42B are arranged in a line again. The joined moving members 42B and 42A are conveyed by the chains 50 and 52 which are guided by guides 27 and 29 (FIG. 3) and move over the member 30 (FIG. 3) along an upper guide groove 33 formed on the top plate 31. In this manner, the moving members are endlessly circulated as shown in FIGS. 2 and 3. The depth of the upper guide groove is such that it will move the pins 44 will again have the shorter protruding lengths $l$ when they return to the cam 80 of the pin-moving device.

Although the embodiment shown and described in FIGS. 1 to 6 relates to an automatic sorting system for 2-kind sorting, a 3-kind sorting routine can also be performed by changing the shapes of guide grooves, the arrangement of the pin-moving device, and the like.

For instance, as shown in FIG. 7A, a guide groove 100 branches off into three guide grooves 102, 104, and 106 which have different depths, the object W is diverted to any one of the three different transverse positions on the conveyor 92 by the rod 46 of the moving member 42.

Figure 7B:
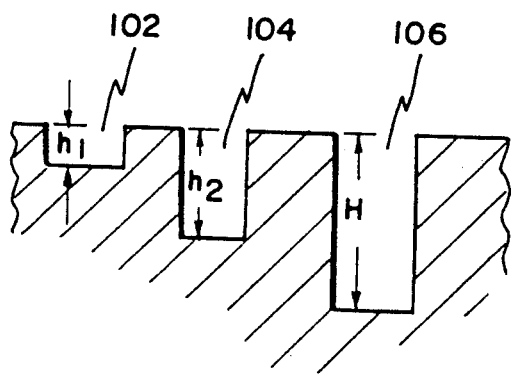
FIG. 7B is a schematic cross sectional view of FIG. 7A.

In FIGS. 7A and 7B, the depth of guide groove 102 is shown by character h1 (FIG. 8), the depth of guide groove 104 is shown by character hz (FIG. 9), and the depth of guide groove 106 is equal to the depth H of the guide groove 100. There is the relation $h1 < h2 < H$.

On the upstream side of a branching section 108, depending lengths of guide-following pins 112A, 112B, and 112C of moving members 110A, 110B, and 110C are set to $l1$, $l2$, and $l3$ by the pin-moving device, respectively. The depending length $l1$ of pin 112A of the moving member 110A is set to be $h1 > l1$. The depending length $l2$ of pin 112B of the moving member 110B is set to be $h1 < l2 < h3$. The depending length $l3$ of pin 112C of the moving member 110C is set to be $h2 < l3 \leq H$.

Figure 9:
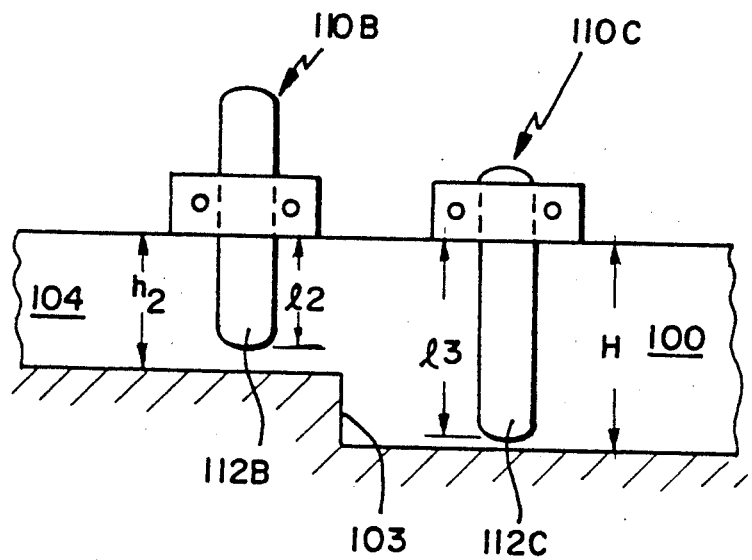

When the moving members 110A, 110B, and 110C, moving in the direction of the arrow F shown in FIG. 7A, arrive at the branching section 108, the pin 112A of the moving member passes over the diverting wall 101 and enters a guide groove 102 as shown in FIG. 8. However, since the pins 112B and 112C of the moving members 110B and 110C cannot pass over the diverting wall 101, the members 110B and 110C try to enter a guide groove 104 along the diverting wall 101. As shown in FIG. 9, the pin 112B of the moving member 110B can pass over the diverting wall 103 and can enter the guide groove 104. However, since the pin 112C of the moving member 110C cannot pass over the diverting wall 103, it enters the guide groove 106. Consequently, the moving members 110A, 110B, and 110C are led to the guide grooves 102, 104, and 106, depending on the depending lengths of their guide-following pins. If the number of grooves to be branched is increased to four or more, similar operations may also be also executed.

Figure 7C:
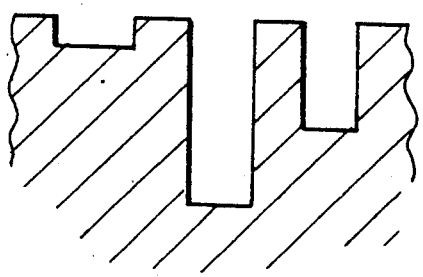
FIG. 7C is a cross sectional view showing still another embodiment of the present invention and is similar to FIG. 7B.

As mentioned above, there is the relation of $h1 < h2 < H$ among the depths of the three guide grooves 102, 104, and 106 shown in FIGS. 7A, 8, and 9, and this relation is shown in FIG. 7B. However, even when the depths of these grooves are set as shown in FIG. 7C, the 3-kind sorting operation is also performed similarly.

Figure 10:
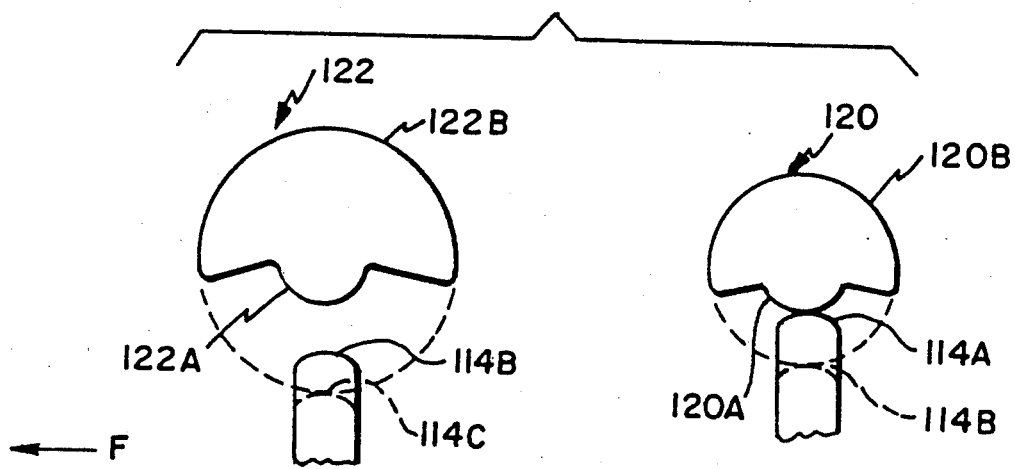
FIG. 10 is a front view of a pin-moving device which is used in the embodiment shown in FIGS. 7A to 7C.

As a mechanism for setting the depending lengths of the guide-following pins 112A, 112B, and 112C to $l1$, $l2$, and $l3$, it is possible to use a mechanism in which two cams each have two arcs of different radii are arranged serially as shown in FIG. 10. In FIG. 10, a cam 120 has a small arc portion 120A and a large arc portion 120B. A cam 122 comprises a small arc portion 122A and a large arc portion 122B. The small arc portions 120A and 122A have the same radii. The radius of the large arc portion 120B is smaller than that of the large arc portion 122B. The cam 120 is arranged on the upstream side of the cam 122.

When an upper end portion 114A of the pin 112A passes under the cams 120 and 122, the small arc portions 120A and 122A face downward, so the pin passes without being depressed downwardly.

When an upper end portion 114B of the pin 112B having the depending length $l2$ passes under the cams 120 and 122, the cam 120 is rotated by a half revolution in response to a signal generated from the detecting device DD, so that the large arc portion 120B faces downward and the upper end portion of the pin 112B is depressed to the position indicated by reference numeral 114B. In this case, since the small arc portion 122A of the cam 122 faces downward, the short portion 112B is not depressed downward by the cam 122.

Before the pin 112C having the depending length $l3$ passes, the cams 120 and 122 are rotated so that both of the large arc portions 120B and 122B face downward. When the pin 112C passes under the cam 120, the upper end portion of the pin 112C is depressed to the position 114B shown by a broken line. Next, when the pin 112C passes under the cam 122, the upper end portion is depressed to a position indicated at 114C.

Figure 11:
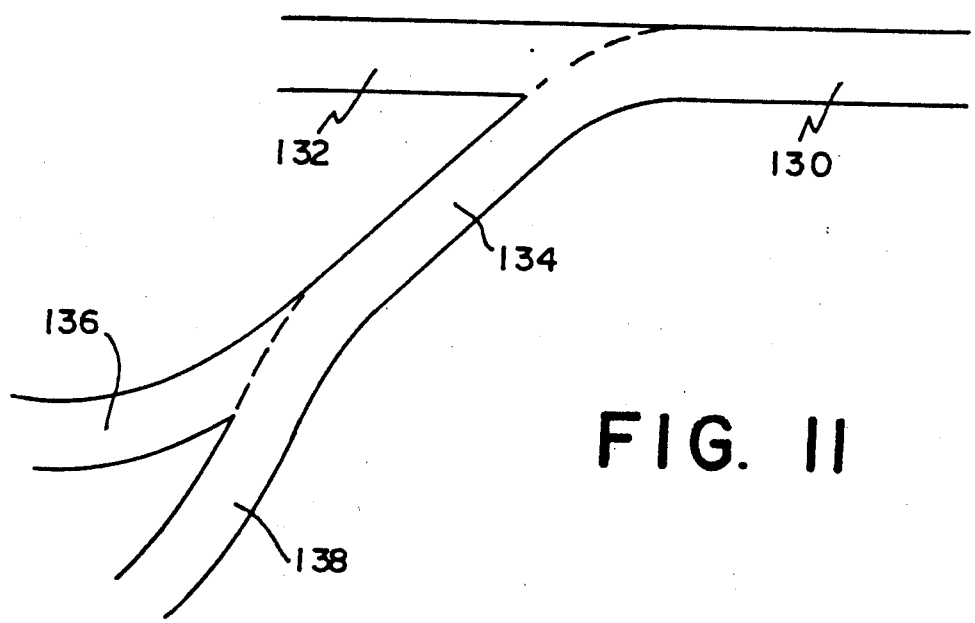
FIG. 11 is a plan view of a guide groove used in further another embodiment of the present invention.

In place of having a guide groove which branches into three grooves at one position as shown in FIG. 7, two or more branching sections can be also provided as shown in FIG. 11. A guide groove 130 branches off into grooves 132 and 134. The guide groove 134 is further branched off into grooves 136 and 138 on the downstream side. The guide grooves 132, 136, and 138 have different depths. Guide-following pins having three different depending lengths enter the guide grooves of the corresponding depths, in a manner similar to the embodiment described in FIGS. 7 to 9. Although two branching sections are shown in FIG. 11, by increasing the number of branching sections, the number of grooves can be increased in correspondence to the number of kinds of objects to be sorted.

Figures 12A, 12B:
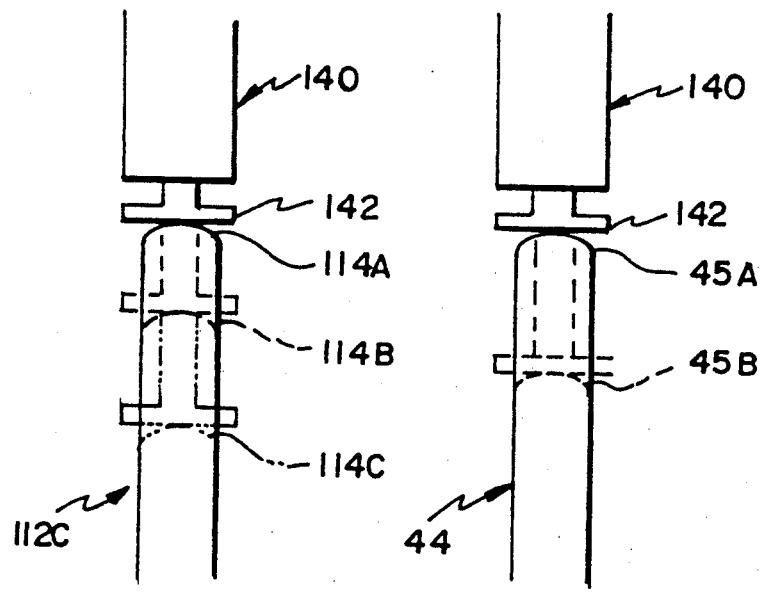
FIGS. 12A and 12B are front views of other embodiments of a pin-moving device, respectively.

In place of using the cam 80 (FIG. 5) and cams 120 and 122 (FIG. 10), a piston member 140 shown in FIGS. 12A and 12B can be also used as the pin-moving device. In FIGS. 12A and 12B, the piston member 140 has a depressing member 142 and this depressing member depresses the pin of the moving member in response to a signal generated from the detecting device DD. FIG. 12A shows the case where the piston member 140 is used for the 2-kind sorting which has already been described in conjunction with FIGS. 1 to 6. When the moving member 42A shown in FIG. 6 passes under the piston member 140, the depressing member 142 does not move downwardly and the upper end portion 45A of the pin is not depressed downwardly. However, when the moving member 42B shown in FIG. 6 passes, the depressing member 142 descends to depress the upper end portion of the pin to the position 45B indicated by a broken line.

In the case of 3-kind sorting shown in FIGS. 7 to 11, as shown in FIG. 12B, the depressing member 142 descends to two height levels and the upper end portion of the pin is located at a predetermined position 114A (indicated by a solid line), 114B (shown by a broken line) or 114C (shown by a double dot line).

Figure 13A:
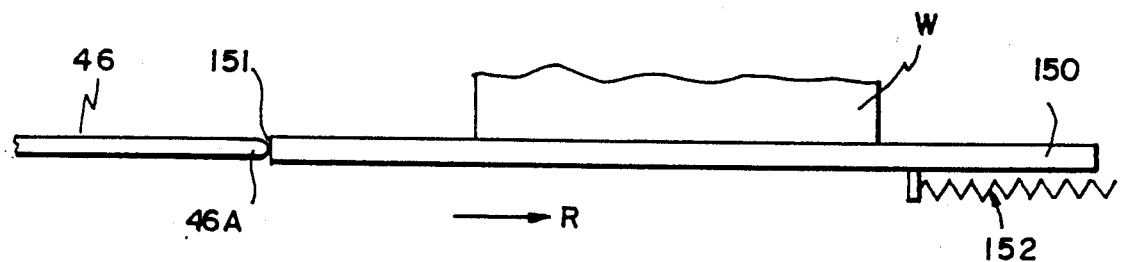
FIG. 13A is a front view showing another embodiment of a rod which is used in the present invention.
Figure 13B:
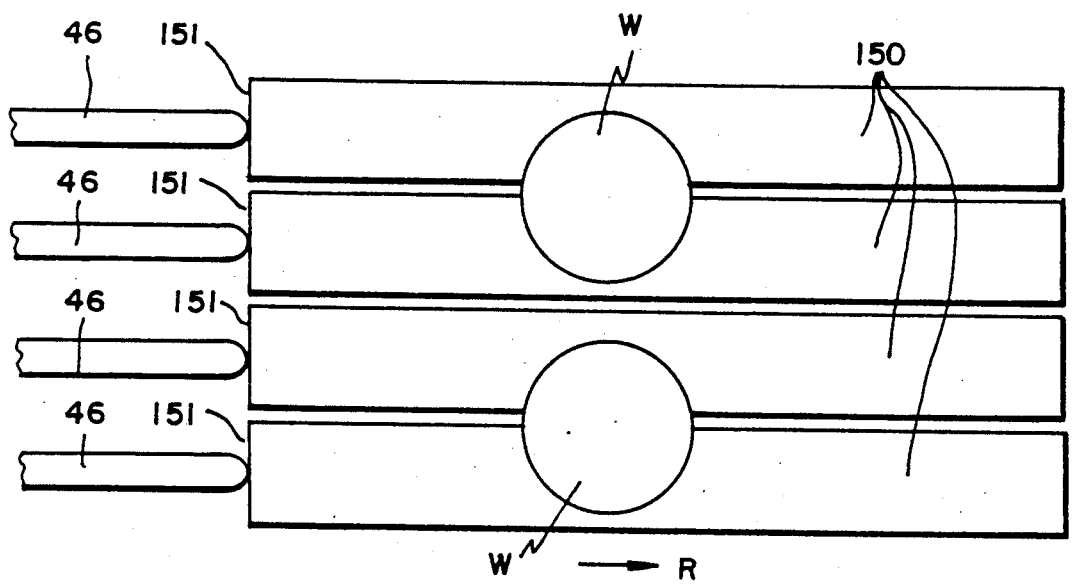
FIG. 13B is a plan view of the embodiment shown in FIG. 13A.
Figure 13C:
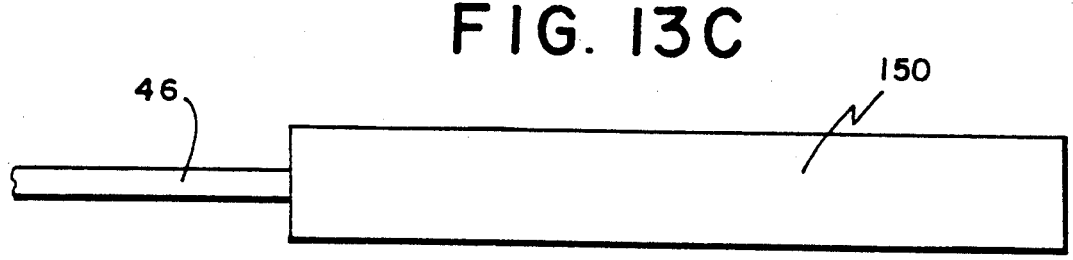
FIG. 13C is a plan view showing still another embodiment of the present invention.

FIGS. 13A to 13C illustrate other embodiments for diverting an object W by means of the rod 46. In FIG. 13A, the front end portion 46A of the rod 46 contacts a side edge portion 151 of a flat plate 150 on which the object W is put. Therefore, when the moving member moves in the direction of an arrow R along the guide groove, the front end portion 46A of the rod 46 pushes out the flat plate 150, so that flat plate 150, which carries the object W, is also pushed out in the direction of the arrow R. Reference numeral 152 denotes a biasing device for pressing the flat plate 150 in the direction opposite to the direction shown by arrow R. The biasing device 152 consists of, e.g., a spring or the like. When the moving member moves in the direction opposite to the arrow R, the flat plate 150 is pressed toward the rod 46 by the biasing device 152. Thus, the front end portion 46A of the rod 46 and the side edge portion 151 of the flat plate 150 are always held in contacting relation.

One object W may be put on one flat plate 150 or may be put on a plurality of flat plates 150. FIG. 13B shows the case where one object W is put on two flat plates 150.

FIG. 13C shows an example in which the flat plate 150 and rod 46 are rigidly interconnected.

Figure 13D:
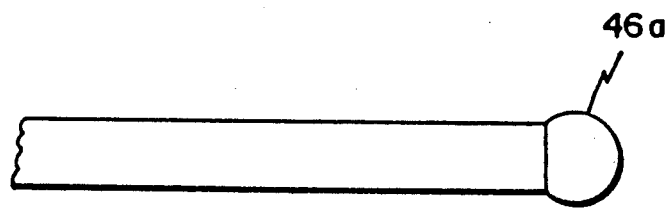
FIG. 13D shows an elastic-tipped rod suitable for use in the invention.
Figure 13E:
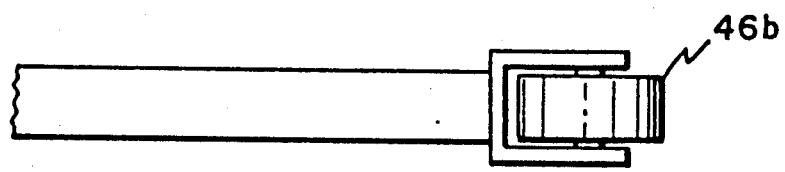
FIG. 13E shows a roller-tipped rod for use in the invention.
Figure 14A:
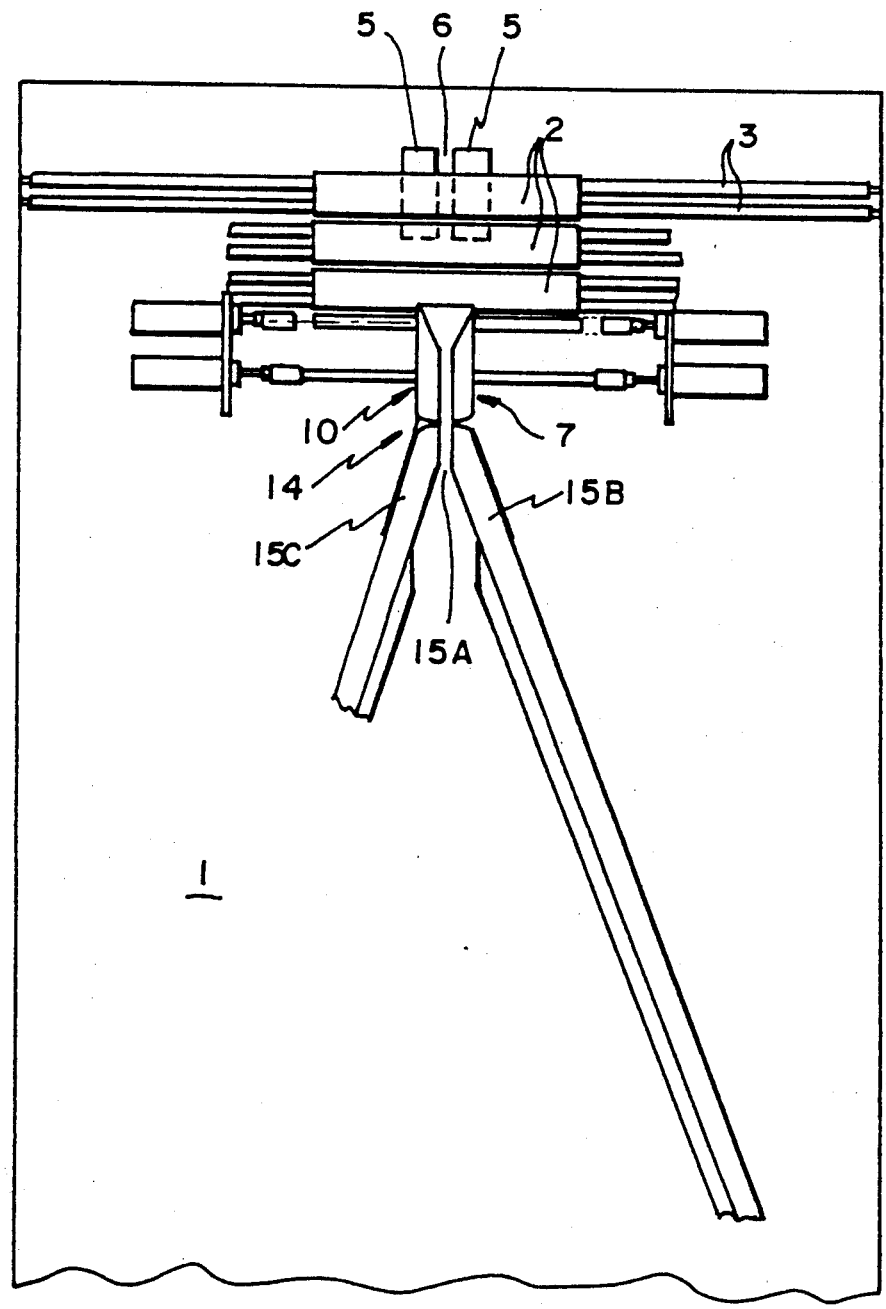
FIG. 14A is a plan view showing a conventional automatic sorting apparatus.
Figure 14B:
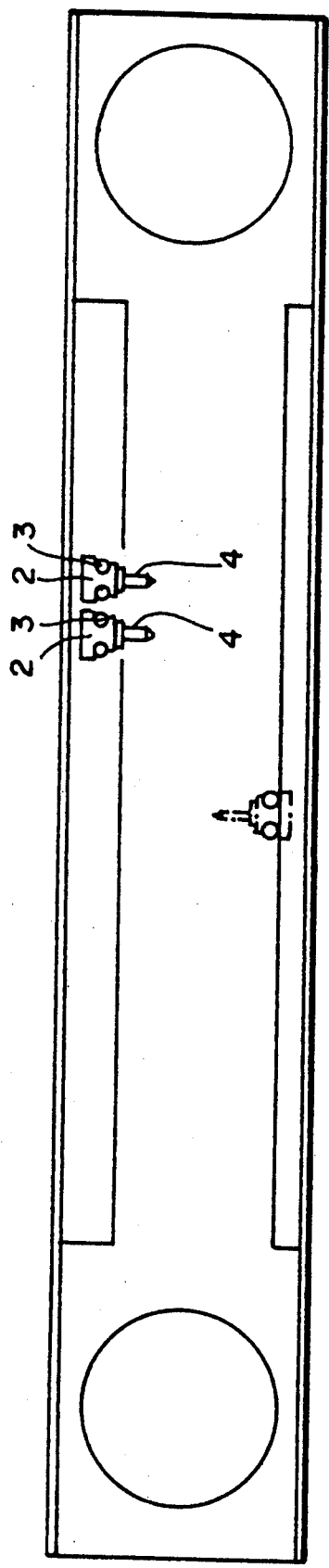
FIG. 14B is a side elevational view of the apparatus shown in FIG. 14A.
Figure 15:
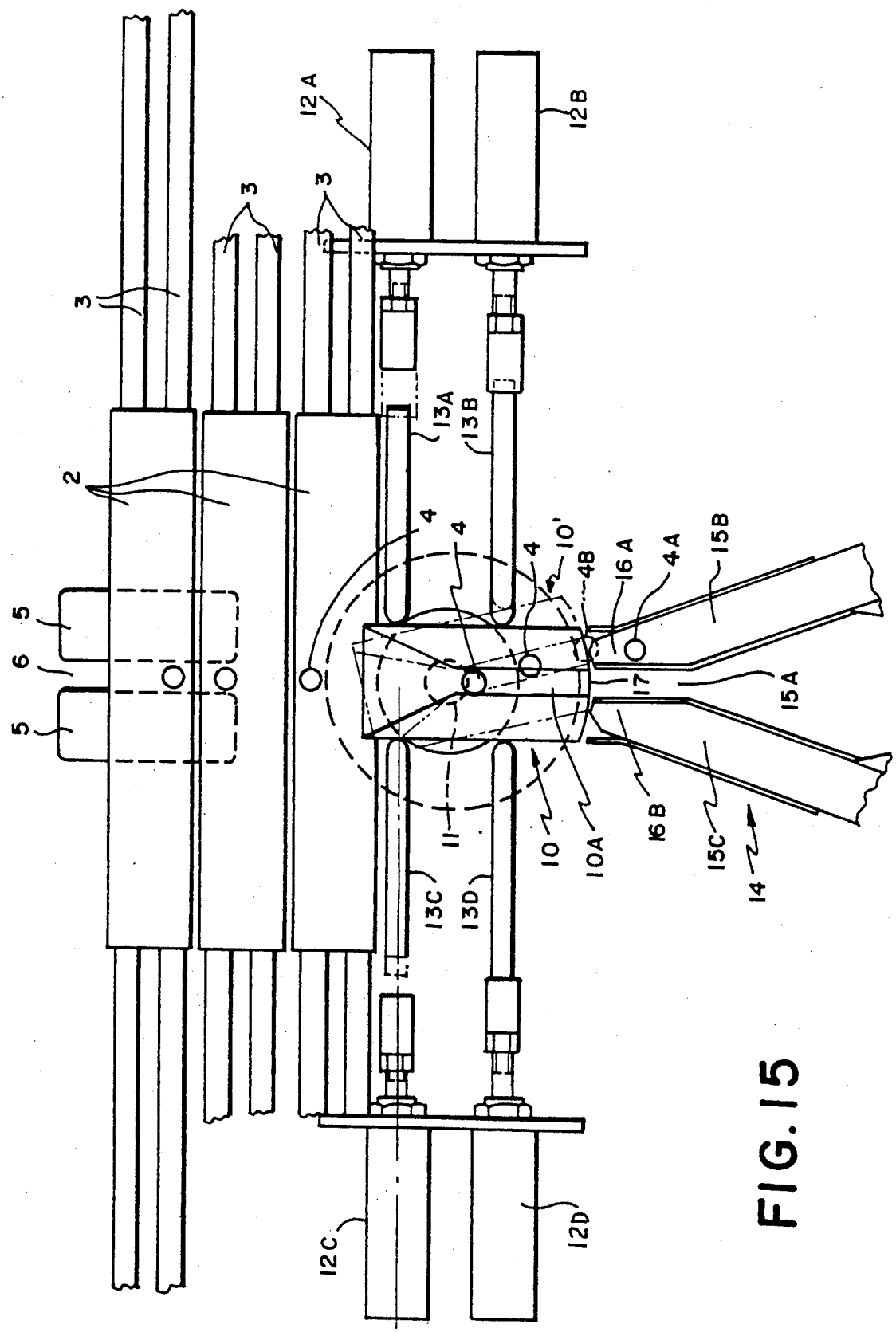
FIG. 15 is a partial enlarged diagram of FIG. 14A.

An alternative rod with elastic material on its tip 46a is shown in FIG. 13D; and another type of rod with a rotatable roller 46b on its end portion is shown in FIG. 13E.

As described above, according to the automatic sorting system of the present invention, a special object is diverted by the moving member and then sorted on the basis of the position of the object. A discrimination regarding whether the moving member should divert a special object or not is made in dependence on which control guide the pin of the moving member is following. Each pin enters only the control guide having the depth corresponding to the depending length of the pin. The depending length of each guide-following pin is adjusted by the pin-moving device in accordance with a signal generated from the detecting device DD.

Therefore, the structure of the automatic sorting system of the present invention is very simple, and, even if the sorting speed is increased, there is no malfunction. Moreover, since this system can be quickly installed adjacent to of any existing conveyor, it is very economical.

Details of the detecting device DD of the automatic sorting system is not shown in the drawing, but it is possible to use various kinds of well-known measuring or discriminating devices such as those which have various sensors such as photosensors or magnetic sensors, or those which have mechanical measuring means such as weight checkers, weighing instruments, or the like.

Although the present invention has been shown and described with respect to preferred embodiments, various changes and modifications are deemed to lie within the spirit and scope of the invention.

What is claimed is:

1. An automatic sorting system for sorting objects which are conveyed in a machine direction, comprising:
   a control guide having a groove which diverges into a plurality of branches having upstream ends of different depths, at least one of said branches having a diverting wall at its upstream end;
   moving members which have pins which extend into and are guided by said control guide, said moving members having means for diverting the objects in a direction which is transverse to said machine direction; and
   at least one pin-moving device for moving the pins of the moving members vertically in response to signals from a detecting device, said at least one pin-moving device being located upstream of the branches so that the vertical position to which the pin is moved by the pin-moving device will determine whether or not said pin will contact said diverting wall and thus determine which of the branches will be followed by the pins and their respective moving members.

2. A system according to claim 1, having a branching section wherein said control guide branches off into only two branches.

3. A system according to claim 1, having a branching section wherein said control guide branches off into three or more branches.

4. A system according to claim 1 having at least two branching sections where the control guide branches off into at least two branches.

5. A system according to claim 4 having a plurality of pin-moving devices.

6. A system according to claim 1 wherein said branches of the control guide converge in a downstream direction to form one control guide.

7. A system according to claim 1, wherein the means for diverting objects includes rods which extend transversely from the moving members.

8. A system according to claim 7, wherein plates for diverting the objects are attached to end portions of the rods.

9. A system according to claim 7, wherein an elastic material is attached to end portions of the rods.

10. A system according to claim 7, wherein rotatable rollers are attached to end portions of the rods.

11. A system according to claim 7 having flat plates for supporting the objects being sorted, and the rods have front end portions which are in contact with edges of said flat plates.

12. A system according to claim 11, further having means for biasing said flat plates toward the rods.

13. A system according to claim 7 having flat plates for carrying the objects being sorted, and the rods of said moving members are fixed to said flat plates.

14. A system according to claim 7, wherein each moving member has a main body portion which is rigidly connected to the rod, and said pins slidably penetrate said main body portion.

15. A system according to claim 7, having a chain which has links which are slidably penetrated by the rods of the moving members, and a plurality of moving members simultaneously move with said chain.

16. A system according to claim 15, wherein said chain is a silent chain.

17. A system according of claim 7 having a timing belt including a thrust bearing having its axis lying perpendicular to the movement direction of said moving member.

18. A system according to claim 1, wherein said at least one pin-moving device includes a cam which has a plurality of arcs of different radii.

19. A system according to claim 18 having a cam-rotating means which includes a rotating shaft, a sprocket on the rotating shaft, and a chain.

20. A system according to claim 19 including a clutch means that operates to rotate the cam in response to signals from the detecting device.

21. A system according to claim 18, having a shaft for rotating the cam, a rotation driving member directly coupled with said rotating shaft, said rotation driving member being operable in response to a signal from the detecting device.

22. A system according to claim 1, wherein said at least one pin-moving device comprises a piston member which has a stroke that changes in response to a signal from the detecting device.

23. A system according to claim 1 having a conveyor which carries the objects, said conveyor being arranged adjacent to said moving members.

24. A system according to claim 23 wherein said moving members divert the objects transversely on the conveyor while the moving members are moving longitudinally along said control guide, and the objects are sorted on the basis of their transverse positions on the conveyor.

25. A system according to claim 24, having a drive chain connected to the moving members, wherein the conveyor and the chain move at synchronized speeds.

26. A system according to claim 1 wherein only the objects which are determined as good articles are diverted in a transverse direction by the moving members.

27. A system according to claim 1 wherein only the objects which are determined as defective articles are diverted in a transverse direction by the moving members.

28. A system according to claim 1 wherein said control guide is formed on a bottom plate and said at least one pin-moving device pushes the pin of the moving member vertically downwardly in response to a signal from a detecting device.

29. A system according to claim 1 wherein said control guide is formed on a top plate and said at least one pin-moving device moves the pin of the moving member vertically upwardly in the vertical direction in response to a signal from the detecting device.

* * * * *